UNITED STATES PATENT OFFICE.

DANIEL A. WILCOX AND SIDNEY H. WILCOX, OF GARDEN CITY, NEW YORK.

UTILIZATION OF TIN-SCRAP.

1,310,381. Specification of Letters Patent. Patented July 15, 1919.

No Drawing. Application filed October 26, 1914, Serial No. 868,759. Renewed December 2, 1918. Serial No. 265,055.

*To all whom it may concern:*

Be it known that we, DANIEL A. WILCOX and SIDNEY H. WILCOX, both citizens of the United States, residing, respectively, at Garden City, Nassau county, State of New York, have invented certain new and useful Improvements in the Utilization of Tin-Scrap; and we do hereby declare the following to be a full, clear, and exact description of the invention, such as will enable others skilled in the art to which it appertains to make and use the same.

Our invention relates to the utilization of tin scrap, for the purpose of converting it into useful products. It comprises a preliminary operation wherein the tin and the iron of the scrap are converted respectively into the chlorids of those metals, the chlorids being subsequently separated and treated further for the recovery of the metals themselves, and of the chlorin or a major part thereof in a form suitable for reuse.

In the practice of the invention, we may conveniently compress the tin scrap (such as tin cans, tin sheet clippings, or the like) into suitable form and dimensions for convenient transportation or shipment to the plant where the operation is to be practised. It being a characteristic of the invention that both the tin and the iron are to be converted into chlorids, it is not necessary to take any precautions with respect to the compression of the tin scrap, which may, therefore, be reduced to as small dimensions as is economically feasible with the facilities that happen to be at hand.

In accordance with the invention, the tin scrap may then be subjected to the action of chlorin, either in the form of chlorin gas, or in the form of some suitable chlorin compound, which upon heating will release chlorin, or in the presence of an admixture of substances which by their interaction will produce chlorin.

In order to start the operation with vigor, it will be desirable to heat the tin scrap. The formation of tin chlorid being an exothermic reaction, the heat thus generated will be utilizable in the chloridizing of the iron, and a sufficient additional amount of heat will be supplied, where necessary, to permit the chloridizing of the iron to proceed with facility and completeness. In fact, the chloridizing of the iron is itself an exothermic reaction and the heat thus evolved will be utilized in the maintenance of the thermal conditions required.

Any suitable furnace may be employed for containing the tin scrap and for subjecting it to the action of the chlorin. Where a current of chlorin gas is employed, it may be applied to the surface of the tin scrap, which has first been brought to the necessary temperature for the purpose. In general, however, it will be preferable to place the scrap in a closed chamber and after raising the temperature to a suitable point, admit chlorin gas, at the same time allowing the mixed chlorids to volatilize and pass off.

Instead of employing a closed chamber, a reverberatory furnace may be used or the furnace employed may be a Bessemer converter, into which molten scrap is run, whereupon the gaseous chlorin is blown through the twyers, in manner similar to the bessemerizing of cast iron or the bessemerizing of copper matte. Or the operation may be conducted in a cupola or a blast furnace or in an electric melting furnace, the gaseous chlorin being conducted through or over the melted or heated metal, in any suitable manner. Or, the tin scrap may be treated in a muffle furnace, a kiln of the type of the cement kiln, or we may melt the scrap and then run it into a long furnace of the reverberatory type, in such manner that the metal will run down the sole or bed of the furnace in a direction opposed to a counter current of chlorin, suitable baffles being provided to cause the chlorin to play over the surface of the metal.

In any event, the passage of the chlorin gas through or over the hot metal will result in the production of tin chlorid and the production of iron chlorid. Both of these chlorids are volatile, and may be recovered separately by fractional condensation, inasmuch as their boiling or subliming points are at greatly different temperatures. Or, if desired, they may be condensed together and separated afterward by boiling, whereupon the tin chlorid will distil off from the iron chlorid. Or they may be both brought into solution and the tin separated as an oxychlorid. Or they may both be brought into solution and the tin precipitated as metallic tin by means of metallic zinc, with the formation of zinc chlorid. In fact, the tin may be precipitated by any other metal of the electrolytic series higher than itself, and the iron will not come down until all the tin is precipitated.

Where the tin is separated as tin chlorid from the iron chlorid it may be either reduced to metallic tin by any suitable reducing agent, such as zinc, or by the aid of the electric current, or it may be converted over into tin oxid and sold as such.

The source of the gaseous chlorin should be such that it will contain no prejudicial impurities. Preferably, gaseous chlorin obtained by the electrolysis of salt solutions will be employed, or any other source of chlorin may be adopted, as, for instance, the chlorin produced by the interaction of common salt, manganese dioxid and sulfuric acid, or even chlorin produced by heating common salt to decomposition.

At appropriate temperatures the iron chlorid is sublimed in the form of $FeCl_3$, and the vapors of $FeCl_3$ may be condensed out in solid form in cooling chambers. Being readily soluble, the crystals of $FeCl_3$ may be dissolved in water by any convenient means, or, instead of condensating the $FeCl_3$ as a solid, the vapors may be led into water, so that condensation and solution are effected at one and the same time.

The chloridized iron is then electrolyzed. In order to obtain the best results, however, both with respect to economy of current and convenience of operation, it will be desirable to first reduce the $FeCl_3$ to $FeCl_2$. This reduction may be accomplished, in various ways, as, for instance, by passing the $FeCl_3$ solution over metallic iron at a temperature sufficiently high to cause the iron to act upon the $FeCl_3$ and reduce it to $FeCl_2$. Or other reducing agents, such as $SnCl_2$, or the like, may be used, or a certain amount of $SnCl_2$ may be added to the solution after reduction by metallic iron in order to prevent subsequent oxidation and to fully insure that all of the iron is in a ferrous condition, which is preferable, although not essential.

Any suitable method may be employed for the electroylsis of the iron chlorid solution for the recovery of the iron, which is obtainable from the solution in a condition of great purity. Any additional agents, appropriate to the operation may be added to the bath, such as a glue or other organic substance or ammonium sulfate and the like. So also, as insoluble electrodes will be employed, means for maintaining the electrolyte at a constant concentration may be used, and suitable means to prevent polarization may be employed.

As indicated, the iron produced is in a condition of great purity, and, in its production from the waste scrap, it has been obtained at a relatively low cost, all of the impurities of the iron having been eliminated during its course of treatment. That is to say, the impurities contained in the iron either do not react with chlorin to form chlorids soluble in water, or they do not form volatile chlorids, or when they form volatile and soluble chlorids they condense at a point higher or lower than that of $FeCl_3$ and are thus separable, or even if present in the iron chlorid solution they are not deposited by the electric current. It will be noted, therefore, that, at a relatively low cost, the iron of the tin scrap is converted into practically pure iron, the only impurity being hydrogen, which may be readily eliminated by reheating the iron or melting it after electrolysis. The chlorin separated in the electrolysis may be reused in the chloridizing of further batches of tin scrap.

What we claim is:

1. The method of utilizing tin scrap, which comprises subjecting the scrap to the action of chlorin at temperatures appropriate to the free conversion of the tin and iron into chlorids of those metals, and thereafter separating the resulting chlorids from each other, substantially as described.

2. The method of utilizing tin scrap, which comprises subjecting the scrap to the action of chlorin at temperatures appropriate to the free conversion of the tin and iron into chlorids of those metals, removing the chlorids thus formed by volatilization, and thereafter separating the chlorids from each other, substantially as described.

3. The method of utilizing tin scrap, which comprises subjecting the scrap to the action of chlorin at temperatures appropriate to the free conversion of the tin and iron into chlorids and to the volatilization of the tin and iron chlorids thus produced, and thereafter separating the volatilized chlorids, substantially as described.

4. The method of utilizing tin scrap, which comprises subjecting the scrap to the action of chlorin at temperatures appropriate to the free conversion of the tin and iron into chlorids of those metals, removing the chlorids thus formed by volatilization, and thereafter separating the chlorids from each other by fractional condensation, substantially as described.

5. The method of utilizing tin scrap, which comprises subjecting the scrap to the action of chlorin at temperatures appropriate to the free conversion of the tin and iron into chlorids of those metals, recovering a major portion of the chlorin from the resulting chlorids in a form suitable for reuse, and re-using the chlorin thus recovered in the conversion into tin and iron chlorids of a further quantity of tin scrap, substantially as described.

6. The method of utilizing tin scrap, which comprises subjecting the scrap to the action of chlorin at temperatures appropriate to the free conversion of the tin and iron into chlorids of those metals, thereafter separating the resulting chlorids from each other, recovering a major portion of the chlorin from the resulting chlorids in the form suitable for reuse, and re-using the chlorin thus recovered in the conversion into tin and iron chlorids of a further quantity of tin scrap, substantially as described.

7. The method of utilizing tin scrap, which comprises subjecting the scrap to the action of chlorin at temperatures appropriate to the free conversion of the tin and iron into chlorids of those metals, separating the resulting chlorids, recovering the major portion of the chlorin for reuse by reduction of the iron chlorid to metallic iron, and re-using the chlorin thus recovered in the conversion into tin and iron chlorids of a further quantity of tin scrap, substantially as described.

8. The method of utilizing tin scrap, which comprises subjecting the scrap to the action of chlorin at temperatures appropriate to the free conversion of the tin and iron into chlorids of those metals, separating the resulting chlorids, recovering the major portion of the chlorin for reuse by electrolytic reduction of the iron chlorid to metallic iron, and re-using the chlorin thus recovered in the conversion into tin and iron chlorids of a further quantity of tin scrap, substantially as described.

9. The method of utilizing tin scrap, which comprises subjecting the scrap to the action of chlorin at temperatures appropriate to the free conversion of the tin and iron into chlorids of those metals, separating the resulting chlorids from each other, recovering the chlorin from the iron chlorid for reuse by preliminarily converting the iron chlorid from ferric to ferrous chlorid, and electrolytic reduction of the ferrous chlorid to metallic iron, and re-using the chlorin thus recovered in the conversion into tin and iron chlorids of a further quantity of tin scrap, substantially as described.

10. The method of utilizing tin scrap, which comprises subjecting the scrap to the action of chlorin at temperatures appropriate to the free conversion of the tin and iron into chlorids of those metals, separating the resulting chlorids from each other, recovering the chlorin from the iron chlorid for reuse by preliminarily converting the iron chlorid from ferric to ferrous chlorid, and electrolytic reduction of the ferrous chlorid to metallic iron while maintaining the concentration of the electrolytic bath constant and using insoluble electrodes, and re-using the chlorin thus recovered in the conversion into tin and iron chlorids of a further quantity of tin scrap, substantially as described.

In testimony whereof we affix our signatures, in presence of two witnesses.

DANIEL A. WILCOX.
SIDNEY H. WILCOX.

Witnesses:
  FRED C. BATCHELLOR,
  FRANCIS BOYLE.